Dec. 4, 1934.     A. Y. DODGE     1,983,123
REVERSIBLE REACTANCE CLUTCH
Filed Feb. 12, 1931
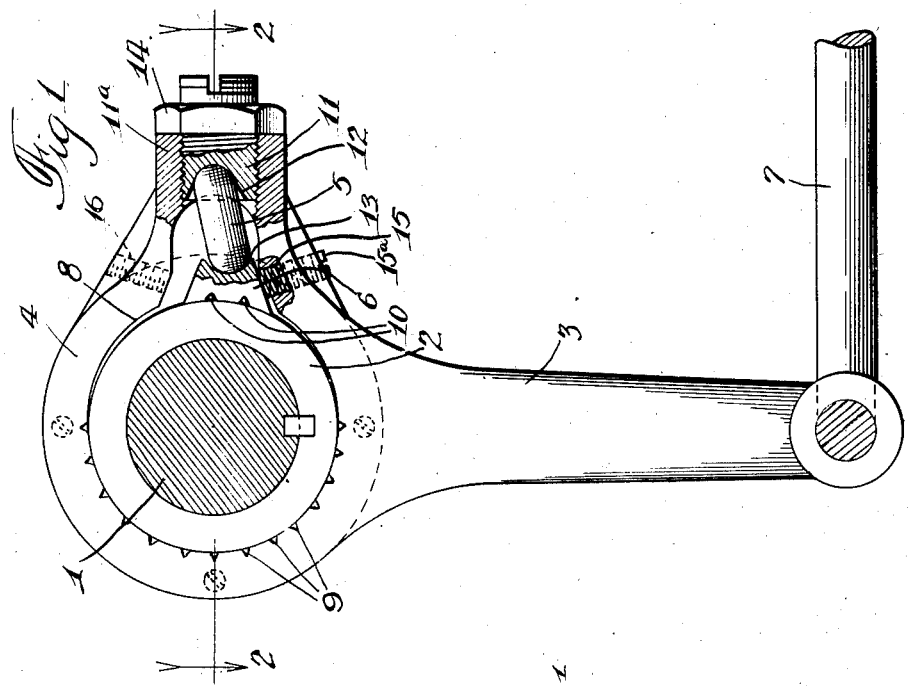
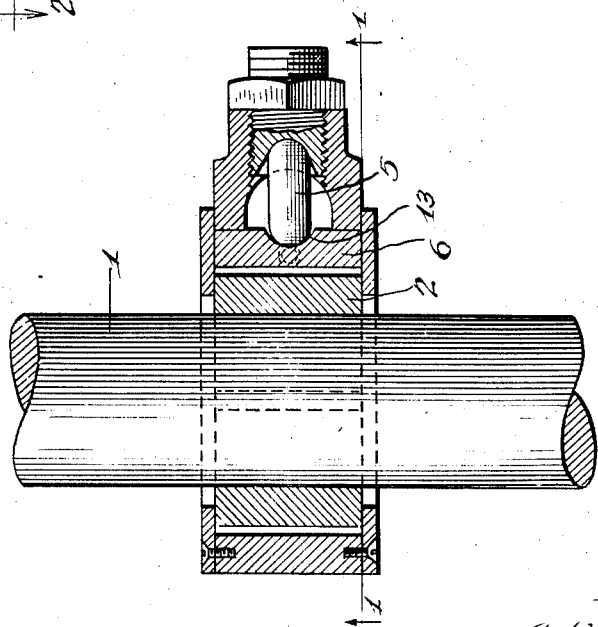
Inventor
Adiel Y. Dodge
By Jones, Addington, Ams & Seibold
Atty's Patented Dec. 4, 1934

1,983,123

UNITED STATES PATENT OFFICE 1,983,123

REVERSIBLE REACTANCE CLUTCH

Adiel Y. Dodge, South Bend, Ind.

Application February 12, 1931, Serial No. 515,223

6 Claims. (Cl. 192—43)

My invention relates to transmissions.

One of the objects of my invention is to provide an improved transmission for converting reciprocatory or oscillatory motion into uni-directional rotational motion.

A further object is to provide such a construction which will grip immediately on the power stroke and release immediately on the return stroke.

Another object is to provide such a construction which will be smooth and efficient in operation.

A further object is to provide such a construction which can be readily changed so as to reverse the direction of rotation.

Further objects will appear from the description and claims.

In the drawing, in which an embodiment of my invention is shown,

Figure 1 is a section on the line 1—1 of Fig. 2, parts being broken away, and

Fig. 2 is a section substantially on the line 2—2 of Figure 1.

Referring to the drawing in detail, the construction shown comprises a rotatable driven shaft 1, a collar or sleeve 2, keyed to said shaft, a rock arm 3 having a collar portion 4 surrounding the keyed collar 2 and oscillatable back and forth with respect thereto, a compression toggle link 5 carried by the rock arm 3, a friction gripping shoe 6 engaging the keyed collar 2 and pressed thereagainst by the compression link, and a reciprocatory link 7 pivotally connected to the rock arm for imparting oscillatory motion thereto.

As shown in Fig. 1, the oscillatory outer collar is relieved, as indicated at 8, so as to be out of engagement with the inner driven collar 2, thus allowing a slight yielding action in the driving collar, whereby a self-de-energizing effect of the outer collar is obtained on the return stroke. The lower half of the outer collar may be provided with a series of grooves 9 to break the oil film to increase the gripping action on the power stroke. Similarly the friction shoe may be provided with grooves 10 to break the oil film.

When shaft 1 tends to turn counter-clockwise as shown in Fig. 1 movement of the shaft is arrested. The shaft 1 naturally rolls toward the left in part 4. When the shaft tends to turn clockwise it rolls toward the right in part 4, thus helping to move shoe 6 to the right and effect a disengagement. If part 4 were a close fit on shaft 1 it is apparent that no relief of pressure from shoe 6 could be effected without first causing a slipping to take place for an instant between shaft 1 and part 4. As this slip would be required to take effect while under heavy load such an arrangement would preclude an easy disengagement of the ratchet effect. As shown, with part 4 a loose fit, this sliding is greatly reduced and changed in part to rolling movement during the first instant of disengagement, but during this first instant the load is greatly relieved.

The construction is so designed that the compression link 5 extends at an acute angle with respect to the radial line from the center of the driven shaft 1 through the outer bearing point of the compression link, thus causing a powerful gripping action between the friction shoe and the driven collar. The size of this acute angle may be adjusted within limits by means of the screw 11 threaded into the collar 11a formed on the outer driving sleeve. This screw has a conical depression 12 in which the hemispherical upper end of the compression link 5 is seated. Similarly, the friction shoe 6 has a hollow seat 13 for the lower end of the compression link. The adjusting screw 11 may be held in the desired adjusted position by means of a lock nut 14 threaded on the upper end of the adjusting screw and engaging the upper edge of the collar. Undesirable play of the friction shoe and compression link may be prevented by means of a coil compression spring 15 located in an opening in the driivng collar and adjustably held so as to bear against the side of the friction shoe 6 by means of a screw 15a threaded in said opening. If it is desired to reverse the direction of the rotation of the driven shaft, the adjusting screw 11 is removed and the friction shoe and lower end of the compression link are shifted to the left, as seen in Fig. 1 so that the gripping action of the friction shoe will take place in the reverse direction. The adjusting screw 11 is then again screwed into place and properly adjusted and the spring 15 and screw 15a are removed from the right hand side of the collar, the screw 15a being threaded into the tapped opening 16 in the left hand side of the collar and properly adjusted to limit the play of the friction shoe.

In operation, oscillatory motion of the rock arm will impart uni-directional motion of rotation to the driven collar as the friction shoe 6 will engage the collar 2 to drive it in one direction but will slip idly over this collar when the rock arm is moved in the opposite direction.

While in this description arm 3 is considered to be the driving member, it is apparent that this device may be used wherein arm 3 becomes the torque reaction absorbing member when used as a one-way device to absorb the negative impulses of an impulse type transmission.

Further modifications will be apparent to those skilled in the art and I desire, therefore, to be limited only by the prior art and the scope of the appended claims.

Having thus described my invention what I claim and desire to secure by Letters Patent is:

1. Transmission comprising a driving oscillatable member having a cylindrical surface, a driven rotatable member provided with a socket encircling the driving member and having a surface at one side spaced slightly from said cylindrical surface and having at the other side a semi-cylindrical surface coaxial with said first cylindrical surface and engaging the same, one of said surfaces having means for breaking the oil film between the surfaces, and means for causing gripping engagement between the cylindrical surfaces comprising a toggle action compression element pivotally mounted on one of said members at said one side of the driven member socket.

2. Transmission comprising a driving oscillatable member having a cylindrical surface, a driven rotatable member having a cylindrical surface substantially coaxial with said first cylindrical surface and engaging the same, and means for causing gripping engagement between the cylindrical surfaces comprising a toggle action compression element pivotally mounted on one of said members, and means for adjusting the pivotal mounting to vary the angle of the toggle action, said adjusting means comprising an adjustable screw-threaded fulcrum member on which the toggle member is rockably mounted.

3. In a reactance clutch the combination of substantially concentric inner and outer members having cylindrical surfaces, one of said surfaces being interrupted by oil grooves, a contact shoe, a strut arm for applying pressure to said shoe, adjustable means to adjust angular positions of said strut arm, and means for immediately relieving pressure on said shoe at time of reverse movement comprising clearance in said outer member.

4. In a reactance clutch the combination of a shaft, a sleeve, a shoe, a strut arm in the plane of said sleeve, all associated to comprise a self-contained toggle using the shaft as one arm of said toggle, and clearance between said sleeve and shaft to allow the shaft to move as a toggle arm.

5. In a reactance clutch the combination of a shaft, a sleeve having oil grooves, a shoe having oil grooves, an adjustable strut arm associated to comprise a self-contained toggle using the shaft as one arm of said toggle, and clearance between the sleeve and shaft to allow the shaft to move as a toggle arm.

6. In a reactance clutch the combination of a shaft, a shoe, a strut arm, and a sleeve in the plane of said arm, and having clearance between said sleeve and shaft extending approximately halfway around the sleeve to allow lateral movement between said shaft and sleeve.

ADIEL Y. DODGE.